United States Patent
Al-Haj Ali et al.

(10) Patent No.: US 11,603,418 B2
(45) Date of Patent: Mar. 14, 2023

(54) PROCESS FOR REDUCING THE VOC CONTENT OF PLASTOMERS

(71) Applicant: Borealis AG, Vienna (AT)

(72) Inventors: Mohammad Al-Haj Ali, Porvoo (FI); Michiel Bergstra, Beringen (BE); Charlotta Weber, Porvoo (FI); Gert Stijnen, Beringen (BE)

(73) Assignee: Borealis AG, Vienna (AT)

( * ) Notice: Subject to any disclaimer, the term of this patent is extended or adjusted under 35 U.S.C. 154(b) by 363 days.

(21) Appl. No.: 17/041,282

(22) PCT Filed: May 28, 2019

(86) PCT No.: PCT/EP2019/063820
§ 371 (c)(1),
(2) Date: Sep. 24, 2020

(87) PCT Pub. No.: WO2019/243006
PCT Pub. Date: Dec. 26, 2019

(65) Prior Publication Data
US 2021/0108007 A1    Apr. 15, 2021

(30) Foreign Application Priority Data

Jun. 22, 2018 (EP) .................................... 18179334

(51) Int. Cl.
| | | |
|---|---|---|
| *C08F 6/00* | (2006.01) | |
| *B29B 9/16* | (2006.01) | |
| *B29K 23/00* | (2006.01) | |

(52) U.S. Cl.
CPC ................ *C08F 6/005* (2013.01); *B29B 9/16* (2013.01); *B29B 2009/168* (2013.01); *B29K 2023/08* (2013.01)

(58) Field of Classification Search
USPC .......................................................... 528/483
See application file for complete search history.

(56) References Cited

FOREIGN PATENT DOCUMENTS

| EP | 0047077 | * 10/1982 | ................ C08F 6/00 |
|---|---|---|---|
| WO | WO 2008/015228 | 2/2008 | |
| WO | WO 2018/114071 | 6/2018 | |
| WO | WO 2019/141672 | 7/2019 | |

OTHER PUBLICATIONS

International Search Report for corresponding PCT Patent Application No. PCT/EP2019/063820 dated Aug. 13, 2019.

* cited by examiner

*Primary Examiner* — Fred M Teskin
(74) *Attorney, Agent, or Firm* — Lippes Mathias LLP

(57) ABSTRACT

The present invention relates to a process for reducing the volatile organic compound (VOC) content of plastomers the process comprising the steps of subjecting the plastomer in granular form containing VOCs which is contained in an aeration vessel to a gasflow, and withdrawing granular plastomer from the aeration vessel which has a lower content of VOCs, wherein the average particle size of the granular plastomer is greater than 2.5 mm, preferably greater than 2.7 mm, more preferably greater than 3.0 mm, wherein the gas has a minimum temperature of at least 26° C. measured at a gas inlet of the aeration vessel, and a maximum temperature of 4° C. below the Vicat temperature (10N, ISO 306) of the granular plastomer or 35° C. measured at the gas inlet of the aeration vessel, whatever value is lower, and wherein at least a part of the withdrawn granular plastomer is recirculated to the aeration vessel.

20 Claims, No Drawings

PROCESS FOR REDUCING THE VOC CONTENT OF PLASTOMERS

The present invention relates to a process for reducing the volatile organic compound content of plastomers.

BACKGROUND

Various options for removing volatiles are known involving the use of solvents such as water, the use of vapor as well as hot gaseous streams.

A process for the separation of volatile material from particulate polymer comprising (a) feeding the particulate polymer to a purge vessel, optionally causing it to move through the vessel in substantially plug-flow mode, (b) heating the particulate polymer in the purge vessel to a temperature greater than 30° C., preferably at least 50° C., most preferably at least 70° C. but not too high to avoid agglomerations, i.e. not be greater than about 5° C. below the Vicat softening temperature. This process further comprises the steps of and/or maintaining the polymer at a temperature in this range in the purge vessel, (c) feeding air to the purge vessel counter-current to the movement of the particulate polymer to remove volatile material therefrom, (d) removing the particulate polymer from the purge vessel is known from WO 02/088194.

WO 2006/067146 also summarizes the prior art using hot gas stream for removal of volatiles, whereby the necessary aeration time is inversely proportional to the gas temperature meaning that a compromise must be reached to avoid melting and sticking together of the pellets. According to WO 2006/067146 the typical values for the temperature and the residence time for polyethylene are 80 to 110° C., 5 to 50 hours and 500 to 5000 m³/h/t of product hot gas. In the process of WO 2006/067146 the treatment with hot air in the silo is combined with a pretreatment by a water bath and a cooling after-treatment.

A similar process is described in WO 2004/039848: the particulate polymer is heated to a temperature greater than 30° C. but not too high thus avoiding agglomeration, whereby substantially all of the heating of the particles occurring in the treatment vessel is accomplished by pre-heating the gas feed, usually air, and feeding the gas feed into the treatment vessel. WO 2004/039848 also describes that for lower density polyolefins such as ethylene higher-olefin copolymers having a density of 915 to 945 kg/m³ the temperature should lie in the range of 60 to 80° C. Again as a general advice the temperature to which the polymer material is heated should not be higher than about 5° C. below the Vicat softening temperature. WO 2004/039848 further teaches rates of flow of gas to enter at the bottom of the treatment vessel within 2 to 10 l/h and per square-centimeter of cross-sectional area of the treatment vessel.

However, the known volatile reduction methods still have shortfalls for specific purposes. For example, when producing low density and low melt flow rate polyolefins, particularly low density 0206 or 0208 plastomers, by solution polymerization, the amounts of volatiles are high such as above 400 ppm according to VDA277 measurement in the polymer in granular form. This is generally a problem for low density plastomers, as for reaching lower densities, higher amounts of higher comonomers such as hexene or octene have to be fed to the process. Hence, as higher comonomers (i.e. hexene, octene) are more difficult to remove as lower comonomers (i.e. butene), high amounts of volatiles is a particular problem to be solved for low density plastomers. The amount of volatiles becomes even more problematic, as plastomers are produced by a solution polymerization process, resulting in demanding workup. It is worth mentioning that such high amounts of volatiles are obtained although some reduction naturally takes place during the extrusion step. The high volatile content is particularly problematic for low density plastomers as these may have melting temperatures as low as 47° C. according to ISO 11357 with Vicat temperature being as low as 38° C.

In order to reduce the VOC content in such plastomers low temperatures have to be applied which leads to long aeration times being costly and time consuming. In order to accelerate the aeration process relatively high gas flowrates and/or vacuum is applied which is energy consuming causing even higher costs and still aeration might take up to three days.

It goes without saying that various applications of low density plastomers demand extremely low volatiles such as below 65 ppm (VOC, VDA277), preferably below 50 ppm in certain cases even below 10 ppm.

DESCRIPTION

The present invention is based on the finding that the volatile content of granular plastomers, having an average particle size of greater than 2.5 mm, containing initially volatile organic compounds (VOC, VDA277) of above 150 ppm can be significantly reduced by subjecting the granular plastomer to a gasflow in an aeration vessel, the gas having a temperature from 26° C. to 4° C. below the Vicat temperature (10 N, ISO 306) of the granular plastomer, with the temperature in any case not exceeding 35° C., and withdrawing the granular plastomer from the aeration vessel wherein at least a part of the withdrawn granular plastomer is recirculated to the aeration vessel.

The present invention insofar provides a process for reducing the volatile organic compound (VOC) content of plastomers the process comprising the steps of
  a) subjecting the plastomer in granular form containing VOCs which is contained in an aeration vessel to a gasflow, and
  b) withdrawing granular plastomer from the aeration vessel which has a lower content of VOCs,
    wherein the average particle size of the granular plastomer is greater than 2.5 mm, preferably greater than 2.7 mm, more preferably greater than 3.0 mm,
    wherein the gas has a minimum temperature of at least 26° C. measured at a gas inlet of the aeration vessel, and a maximum temperature of 4° C. below the Vicat temperature (10N, ISO 306) of the plastomer or 35° C. measured at the gas inlet of the aeration vessel, whatever value is lower, and
    wherein at least a part of the withdrawn granular plastomer is recirculated to the aeration vessel.

Definitions

Volatile organic compound content (VOC, VDA277) is a measure of emissions from plastic materials such as low density plastomers which are caused by low-molecular components in the polymer material. These low-molecular components can be residual monomers, oligomers, additives, plasticizers and/or degradation products.

The term gasflow such as used herein denotes the volume of gas flowing per hour referenced to a ton of plastomer.

On the other hand, the term gasstream such as used herein denotes the volume of gas flowing per hour referenced to the cross-sectional area of the aeration vessel measured e.g. at the gas inlet of the aeration vessel.

The term gas such as used herein denotes any gas suitable for being heated up to at least 25° C. and suitable for removing volatile organic compounds from plastomers. Suitable gases are for example nitrogen or air or mixtures thereof. Simply for cost reasons, the most preferred gas for the process of the invention is air.

The gas, which leaves the bed of the pellets, i.e. which took up the volatile organic compounds, is denoted as exhaust gas herein.

The term granular such as used herein denotes a plastomer in the form of pellets and/or granulated material. Usually the pellets or granulated material will result from pelletizing or granulation. For example, pellets can be formed by forcing the plastomer melt through a die and pelletizing it subsequently with an underwater granulator.

Plastomers such as used herein are ethylene alpha olefin copolymers which combine properties of elastomers and plastics, i.e. they have rubber-like properties and the processability of plastic.

The term aeration or aeration process as used herein denotes a process or process step, in which a compound is subjected to a gasflow.

The term pressure of the aeration such as used herein is the pressure which is present inside the aeration vessel. When a silo is used as the most conventional aeration vessel, the pressure is to be easily measured at the free headspace, in particular at the freeboard or at the gas outlet duct on top of the silo.

A batch-wise aeration process is a process, in which plastomers to be aerated are fed to aeration vessels, whereby the whole of each batch is subjected to one stage of the aeration process at a time and the aerated plastomer is removed from the aeration vessel all at once after the process has finished. In contrast to a continuous process, a batch-wise process cannot be carried out for an arbitrary amount of time, as the state of the material (e.g. the content of volatiles) in the aeration vessel defines the time when the process has to be interrupted, e.g. for removing the aerated plastomer and refilling with plastomer to be aerated.

A semi-batch-wise aeration process according to the invention is a process, in which plastomers to be aerated are fed to aeration vessels, whereby the whole of each batch is subjected to one stage of the aeration process at a time. Recirculating at least a part of the plastomers during the aeration process is part of such a semi-batch-wise aeration process. In a semi-batch-wise aeration process according to the invention fresh gas is continuously fed to the aeration vessels. The gas in a semi-batch-wise aeration process contains at the gas inlet almost no VOCs, preferably no VOCs. The aerated plastomer is removed from the aeration vessel all at once after the process has finished.

The term preheating step denotes a step generally preceding the aeration step, in which the granular plastomers are heated up to the desired temperature for aeration. Preheating the granular plastomers can facilitate the aeration process and reduce the time needed for the overall process. Furthermore, certain means of preheating can reduce the power consumption of the aeration process.

The aeration time is the time period between the start and the end of a gasstream and the resulting gasflow in the aeration vessel. Thus, as soon as the gasstream is started and adjusted and the gasflow proceeds through the aeration vessel, the aeration time is running. Respectively, as soon as the gasstream is stopped, i.e. when the desired target VOC content is reached, the aeration time ends. If the granular plastomer is preheated by external means, e.g. without a gasflow, the aeration time also starts with the start of the gasstream after the preheating step. If the granular plastomer is preheated with the help of a gasflow, the aeration time already starts with the start of the gasflow of the preheating step and ends with the stop of the gasflow after the actual aeration step, i.e. when the desired target VOC content is reached.

Recirculation denotes withdrawing at least a part of the granular plastomer from the aeration vessel and returning it back to the aeration vessel. Preferably the granular plastomer is withdrawn from the bottom of the aeration vessel via withdrawal means, in particular a withdrawal pipe, and returned back to the aeration vessel. Preferably the granular plastomer is returned back, also denoted as recycling, to the aeration vessel at the height located at the top of the aeration bed in the vessel.

The recirculation rate (percent per hour) denotes the amount of granular plastomer, in percent, which is withdrawn from the aeration vessel and returned back to the aeration vessel per hour, in relation to the total amount of granular plastomer contained in the aeration vessel.

The term average particle size denotes the average value of the particle size distribution. The size of the particles is to be understood as the diameter of an equivalent circle.

DETAILED DESCRIPTION

It has been surprisingly found that the reduction rates of VOC obtained by the inventive process are excellent for the given energy effort and aeration time.

Further the inventive process can be used in commercial scale to homogeneously reduce volatiles VOC to acceptable levels at relatively low effort. In addition to that there is no need for time consuming aeration of granular plastomers. Besides, the inventive process ensures the uniformity of the VOC concentration along the height of the aeration vessel. Furthermore, the inventive process enhances the flowability of granular plastomers.

In the process according to the present invention, the granular plastomer is subjected to a gasflow in an aeration vessel. In the simplest form the aeration vessel can be any vessel or pipe allowing settling of the plastomer and injection of gas.

In the process according to the present invention the average particle size of the granular plastomer is greater than 2.5 mm, preferably greater than 2.7 mm, and more preferably greater than 3.0 mm measured according to the method described herein. Preferably the particle size is between 2.6 mm and 4.5 mm.

In the process according to the present invention the gas has a minimum temperature of at least 26° C. measured at a gas inlet of the aeration vessel, and a maximum temperature of 4° C. below the Vicat temperature (10N, ISO 306) of the raw plastomer or 35° C. measured at the gas inlet of the aeration vessel, whatever value is lower.

In the process according to the present invention granular plastomer having a lower content of VOCs is withdrawn from the aeration vessel and at least a part of the withdrawn granular plastomer is recirculated to the aeration vessel.

Insofar, the invention relates to a process for reducing the volatile organic compound (VOC) content of plastomers, the process comprising the steps of a) subjecting the plastomer in granular form containing VOCs which is contained in an aeration vessel to a gasflow, and b) withdrawing granular plastomer from the aeration vessel which has a lower content of VOCs, wherein the average particle size of the granular plastomer is greater than 2.5 mm, preferably greater than 2.7 mm, more preferably greater than 3.0 mm, wherein the gas has a minimum temperature of at least 26° C. measured at a gas inlet of the aeration vessel, and a maximum temperature of 4° C. below the Vicat temperature (10N, ISO 306) of the raw plastomer or 35° C. measured at the gas inlet of the aeration vessel, whatever value is lower, and wherein at least a part of the withdrawn granular plastomer is recirculated to the aeration vessel.

In the inventive process preferably at least 20%, more preferably at least 30%, even more preferably at least 40%, even more 50% and most preferably at least 75% of the withdrawn granular plastomer is recirculated to the aeration vessel. According to one preferred embodiment in step b) all of the withdrawn granular plastomer is recirculated.

The granular plastomer is recirculated to the aeration vessel in a recirculation rate. Preferably the recirculation rate of the granular plastomer recirculated to the aeration vessel is between 0.25 and 10 percent per hour, more preferably between 0.5 and 5 percent per hour and even more preferably between 0.75 and 3 percent per hour.

In general it is advantageous when transporting soft granular plastomers that a gentle transportation is used. In case soft plastomers are transported under harsher conditions during recirculation angel hair, strainers and/or dust may form.

The recirculation of the at least a part of the withdrawn granular plastomer to the aeration vessel is preferably conducted at a velocity of less than 15 m/s, more preferably less than 10 m/s, and even more preferably less than 5 m/s.

The recirculation of the at least a part of the withdrawn granular plastomer to the aeration vessel is preferably conducted via low speed plug transport, vacuum plug transport, an elevator or a tubular drag cable conveyor.

Preferably the recirculation is conducted via low speed plug transport wherein the velocity difference between the granular plastomer and the containing wall is less than 15 m/s and more preferably less than 10 m/s.

The advantage of vacuum transport is that no additional air cooling capacity is needed for the transportation process.

Tubular drag cable conveyors have the advantage that the energy consumption is lower compared to other conveying, that is, transportation processes.

The aeration time depends on the starting material and the target VOC content as well as the aeration conditions. In the inventive process the aeration time in step a) is preferably less than 40 hours, more preferably less than 35 hours, even more preferably less than 30 hours and even more preferably less than 25 hours.

In the inventive process step a) is preferably run for at least 2 hours, more preferably for at least 3 hours and even more preferably for at least 5 hours.

In the process according to the present invention, the gas used in step a) is preferably $N_2$ containing gas and more preferably air.

In the inventive process the plastomers are preferably homo- or copolymers of ethylene, more preferably copolymers of ethylene and octene.

The granular plastomer in step a) has preferably a density of equal or lower than 900 kg/m$^3$, more preferably equal or lower than 883 kg/m$^3$, and even more preferably equal or lower than 870 kg/m$^3$.

The granular plastomer in step a) has preferably a MFR$_2$ of 100 g/10 min or lower, more preferably of 25 g/10 min or lower and even more preferably of 6 g/10 min or lower (ISO 1133 at 2.16 kg load and 190° C.).

The inventive process has the advantage that particularly soft plastomers can be treated without agglomeration.

The inventive process is preferably used in a continuous polymerization process.

The granular plastomer withdrawn in step b) which is not recirculated to the aeration vessel has a VOC content (VOC, VDA277) preferably of below 100 ppm, more preferably of below 65 ppm, and even more preferably of below 25 ppm.

The inventive process preferably comprises a further step c) which is recovering the aerated granular plastomer. In step c) the aerated granular plastomer is withdrawn all at once from the aeration vessel and recovered. Preferably the granular plastomer recovered in step c) has a VOC content (VOC, VDA277) preferably of below 100 ppm, more preferably of below 65 ppm, and even more preferably of below 25 ppm.

In the inventive process the aeration vessel preferably comprises a silo. It is highly preferred to use an insulated silo. It should be understood that the use of an insulated silo is preferred for all embodiments as described herein. Preferably the silo comprises a main vertical cylinder and a conical section at the bottom of the cylinder.

Preferably the cone angle of the conical section at the bottom of the cylinder is less or equal 60°, more preferably less or equal 50°, and even more preferably less or equal 40°. The cone angle of the conical section according to the invention is the opening angle of the conical section. The opening angle of the conical section is the vertex angle made by a cross section through the apex and center of the base of the conical section.

The cone angle of the conical section is of particular importance as it is advantageous that mass flow occurs when granular plastomer is withdrawn from the aeration vessel. This results in a more homogeneous product after the aeration process.

Preferably the withdrawn and recirculated granular plastomer is reintroduced into the aeration vessel at the top of the aeration bed in the vessel.

In the process according to the present invention the pressure of the aeration preferably is from 500 hPa to 1300 hPa, more preferably from 700 hPa to 1060 hPa, even more preferably from 800 hPa to 1060 hPa and most preferably ambient pressure. In particular, the process of the present invention does not involve the use of a device for lowering the pressure in the aeration vessel, such as a pump. Thus, the pressure in the vessel is preferably left at ambient pressure. The pressure in the aeration vessel is thus dependent on the height of the silo, the temperature and the velocity of the gasflow in the aeration vessel. In a preferred embodiment, the pressure at the entrance of the gasstream is 0.1 to 0.3 bar higher than the pressure outside of the aeration vessel. Most preferably, the pressure at the entrance of the gasstream is 0.2 bar higher than the pressure outside of the aeration vessel.

In the process of the invention the gasflow in step a) is preferably within the range of 5 m$^3$/(h·t) to 150 m$^3$/(h·t), more preferably within the range of 10 m$^3$/(h·t) to 130 m$^3$/(h·t) and even more preferably 14 m$^3$/(h·t) to 100 m$^3$/(h·t).

The granular plastomer is subjected to a gasstream in step a) the gasstream is preferably within the range of 5.0 l/(h·cm$^2$) to 50.0 l/(h·cm$^2$), more preferably within the range of 7.5 l/(h·cm$^2$) to 45.0 l/(h·cm$^2$), even more preferably within the range of 10.0 l/(h·cm$^2$) to 40.0 l/(h·cm$^2$), even more preferably within the range of 10.0 l/(h·cm$^2$) to 35.0 l/(h·cm$^2$) and still more preferably within the range of 15.0 l/(h·cm$^2$) to 35.0 l/(h·cm$^2$)).

The gas according to the present invention has a minimum temperature of at least 26° C. at a gas inlet of the aeration vessel. Furthermore, the gas according to the present invention has a maximum temperature of 4° C. below the Vicat temperature (10 N, ISO 306) of the granular plastomer or 35° C. measured at the gas inlet of the aeration vessel, whatever value is lower. Thus, if the Vicat temperature (10 N, ISO 306) of the granular plastomer is 38° C., the gas temperature must not exceed 34° C. However, if the Vicat temperature (10 N, ISO 306) of the granular plastomer is 40° C. or even 45° C., the maximum temperature of the gas is 35° C. Preferably the maximum temperature of the gas is 32° C., more preferably 31° C. The minimum temperature of the gas is preferably 27° C. and more preferably 28° C., most preferably 29° C.

As the specific heat capacity of the plastomer together with the mass of the plastomer is significant compared to the specific heat capacity of gas together with the mass of the gas, one has to be attentive that the gasstream temperatures are met for the inlet and the outlet of the aeration. Thus, if the plastomer is provided at relatively low temperature in a silo, a preheating will be necessary. The preheating naturally can also be effected by the gasstream and the temperatures as specified above. However, during such preheating the temperature at the outlet will be lower as the heat is transferred to the plastomer.

For shortening the preheating phase, avoiding energy loss during aeration and/or also increased homogeneity over the cross-section, the use of an isolated aeration vessel, preferentially an isolated silo is preferred.

For the same reasons it is also preferred to use granular plastomer at a temperature of from 26° C. to 34° C., more preferably from 27° C. to 32° C. and most preferably from 29° C. to 31° C.

Thus, the granular plastomer is preferably preheated before the start of the aeration time to speed up the process. Generally, any heating measures known in the prior art can be used for preheating. Either the granular plastomer or the aeration vessel, i.e. the silo, or both together can be preheated.

The plastomer, the aeration vessel or both together can be preheated externally. Under the term externally preheating such as used herein it is understood that the preheating is carried out by external preheating means. External preheating means can be solar collectors, heating by electricity or heating by any kind of radiation. Preheating the aeration vessel externally happens by heating up the walls of the vessel. External heating the walls of the vessel can happen by general means for heating a vessel, e.g. by electricity or, but also simply by sunshine directly on the outer wall of the vessel. The aeration vessel and the plastomer can also be separately preheated by external preheating means and after preheating the preheated plastomer is provided in the preheated aeration vessel.

Preheating could also be considered as not letting the pellets cool down, which are produced, extruded and pelletized shortly beforehand. Such produced pellets normally have a temperature of about 25° C. or higher. Hence, the production process of the plastomer and the process of the current invention can be carried out in an integrated process.

Preheating can also be carried out by starting the process at a higher gasflow and reducing the gasflow to the target gasflow when the temperature at the top of the silo is close to the temperature at the bottom of the silo. Preheating e.g. with steam in a bulk flow heater is no option due to the low Vicat temperatures of the plastomer. Thus, preheating must also meet the conditions of the temperature of the gasflow such as defined for the gasflow above.

Preferably, the plastomer, the aeration vessel or both together are preheated externally.

In the process according to the present invention, the gas used in step a) is preferably injected from the bottom of the aeration vessel. Preferably, the gas is injected via a gas distribution ring located on the bottom cone of a silo, resulting in a gasflow from bottom to top through the bed of pellets.

In a further embodiment of the invention, more than one distribution ring can be provided in the aeration vessel, e.g. sequentially located along the flow pathway of the gas in the bed of pellets and/or with different radii ensuring that the gas distribution in the bed of pellets is homogeneous. Preferably, the gas is introduced through nozzles provided in the distribution ring. More preferably, the gas is introduced to at least two nozzles per distribution ring.

Alternatively, in another embodiment, if the process is carried out in a continuous manner, the gas is preferably also injected at the bottom of the aeration vessel, but it flows upwardly and counter-currently to the downwards flowing pellet flow.

In a particularly preferred embodiment, the recirculation rate is between 0.25 and 10 percent per hour, the aeration time is less than 35 hours and the granular plastomer has a density of equal or lower than 883 kg/m$^3$.

In a further particularly preferred embodiment, the gasflow in step a) is within the range of 10 m$^3$/(h·t) to 130 m$^3$/(h·t), the recirculation rate is between 0.25 and 10 percent per hour and the aeration time is less than 30 hours.

In a further embodiment of the invention, the height/diameter ratio of the bed formed by the plastomer pellets used for the process of the present invention is preferably at least 1, more preferably 3. Moreover, the height/diameter ratio of the bed formed by the plastomer pellets of the present invention does preferably not exceed 6, more preferably does not exceed 5.

The process according to the present invention is preferably run batch-wise or semi-batch-wise, more preferably semi-batch-wise. Continuous aeration is usually undesirable as homogeneity could not be guaranteed. This results from the fact that for the desired residence times in the process, the aeration vessels for a continuous process would become very large. Besides practical considerations, such large aeration vessels behave undesirably in terms of homogeneity of the pellets due to the pellet flow behavior.

In the process of the present invention step a) and step b) preferably are performed simultaneously and/or sequentially. More preferably step a) and b) are performed simultaneously followed by step c) in which the aerated granular plastomer is withdrawn all at once from the aeration vessel and recovered.

In the process according to the present invention the granular plastomer is preferably not mixed or moved throughout the aeration by mechanical means. Absence of mechanical mixing or the like is particularly advantageous since the creation of fines is avoided.

The process according to the present invention is particularly advantageous for granular plastomer obtained by solution polymerization. This is in particular due to the fact that the granular plastomer such as obtained from the production process (i.e. solution polymerization reactor, degassing unit(s) and extruder(s)) usually contains relatively high amounts of VOC. Hence, the volatile organic compound content is usually too high for demanding end-use applications. In addition to that the granular plastomer as obtained directly after cutting should not be cooled to room temperature but recovered in the aeration vessel, i.e. preferentially directly in the isolated silo. Thus, preheating of the plastomer is not necessary. The total process of producing the plastomer and the aeration insofar is an integrated process.

The process according to the present invention comprises a step of preferably subjecting the gas downstream of the aeration vessel to means for removing hydrocarbons. Preferably, these means are selected from one or more catalytic oxidation units, one or more carbon adsorption columns (drums) and/or any conventional exhaust treatment known in the art. Even more preferably, these means are carbon adsorption columns (drums). Preferably, when the aeration gas is air and/or nitrogen, it can be emitted into the atmosphere after removal of the hydrocarbons.

Moreover, the heat still contained in the discharged gas can be transferred to the gas used for aeration via heat exchangers known in the art, if the gas taken from the environment has a temperature lower than the temperature needed for the process. In another embodiment of the invention, a chiller is used, if the gas taken from the environment has a temperature higher after compression than the temperature needed for the process. Preferably, in such a chiller, water is cooled down to ±10 to ±15° C. in a cooler and subsequently used in a heat exchanger to cool down the gas from ±40° C. to ±30° C.

In the process according to the present invention the exhaust gas is preferably discharged into the atmosphere. Alternatively but less preferably the exhaust gas is used again after separation of the VOCs.

The present invention is also concerned with an integrated process for producing granular plastomer, the process comprising the steps of
  a) polymerizing ethylene and 1-ocetene by solution polymerization in at least one polymerization reactor to yield a raw polymerization mixture,
  b) recovering said raw polymerization mixture from the at least one polymerization reactor and feeding said raw polymerization mixture to at least one flash vessel thereby at least partially removing solvent, unreacted monomer and unreacted comonomer to yield a plastomer,
  c) subjecting the plastomer to mixing, preferably by an extruder or a static mixer, and granulation,
  d) recovering granular plastomer,
  e) subjecting said plastomer in granular form containing VOCs which is contained in an aeration vessel to a gasflow, and
  f) withdrawing granular plastomer from the aeration vessel which has a lower content of VOCs,
    wherein the average particle size of the granular plastomer is greater than 2.5 mm, preferably greater than 2.7 mm, more preferably greater than 3.0 mm,
    wherein the gas has a minimum temperature of at least 26° C. measured at a gas inlet of the aeration vessel, and a maximum temperature of 4° C. below the Vicat temperature (10N, ISO 306) of the raw plastomer or 35° C. measured at the gas inlet of the aeration vessel, whatever value is lower, and
    wherein at least a part of the withdrawn granular plastomer is recirculated to the aeration vessel.

All preferred ranges and embodiments as described above also hold for this integrated process and are incorporated by reference herewith.

It is particularly preferred that the granular plastomer is sent directly to the aeration vessel, preferentially to an insulated silo thereby avoiding any unnecessary heat loss.

In the processes of the present invention, i.e. the aeration process and the integrated process as described above, the lower aeration time is not specifically limited. Usually the aeration will be carried out until the volatile organic compound content of the granular raw plastomer versus the final volatile organic compound content of the granular plastomer is at least 4:1, preferably at least 10:1 and most preferably at least 20:1; i.e. if the volatile organic compound content of the granular raw plastomer (as the starting material) has VOC content (VDA277) of 200 ppm, the aeration preferably will be carried out until the final volatile organic compound content of the granular plastomer (i.e. the final product) will be below 65 ppm.

The processes of the present invention, i.e. the aeration process and the integrated process as described above are particularly advantageous within and for the production of the granular plastomer having a $MFR_2$ of 6.0 g/10 min or lower (ISO 1133 at 2.16 kg load and 190° C.). The softer plastomers profit from the very mild process conditions of the inventive processes. Build up of fines and agglomerations are successfully avoided. The advantageous nature is even more pronounced for granular plastomer having a $MFR_2$ of 2.0 g/10 min or lower (ISO 1133 at 2.16 kg load and 190° C.) and most preferably for granular plastomer having a $MFR_2$ of 1.0 g/10 min or lower (ISO 1133 at 2.16 kg load and 190° C.).

Moreover, the inventive processes are preferably concerned with the production or the aeration of granular plastomer having a flexural modulus of 20 MPa or lower, preferably 15 MPa or lower, more preferably a flexural modulus of 10 MPa or lower. When producing or treating such extremely soft materials, the inventive processes successfully avoid agglomerations and nevertheless allow VOC reduction.

Test Methods

In order to determine the parameters mentioned in this application, the following test methods need to be applied.
  a) MFR
    The melt flow rate (MFR) is determined according to ISO 1133 at 190° C. The load under which the measurement is conducted is given as the subscript. Thus, the MFR under the load of 2.16 kg is denoted as $MFR_2$. The melt flow rate $MFR_{21}$ is correspondingly determined at 190° C. under a load of 21.6 kg.
  b) Density
    Density is measured according to ISO 1183-1:2004 Method A on compression moulded specimen prepared according to EN ISO 1872-2 (February 2007) and is given in kg/m$^3$.
  c) Volatiles VOC (VDA277)
    The total emission of plastomers is determined by using head space extraction according to VDA 277:1995 using a gas chromatograph and a headspace method. Suitable equipment is an Agilent gas chromatograph with a WCOT-capillary column (wax type) of 30 m length and 0.25 mm×1.0 micrometer inner diameter (1 μm film thickness). A flame ionization detector is used with hydrogen as a fuel gas. GC settings are as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and carrier gas flow rate of 1 ml/min. The emission potential is measured on the basis of the sum of all values provided by the emitted substances after gas chromatography analysis and flame ionization detection with acetone as the calibration standard. Sample introduction (pellets, about 2 g) is by headspace analysis (20 ml head space vial) after conditioning at 120° C. for 5 hours prior to the measurement. The unit is microgram carbon per gram of sample, respectively ppm.

d) The average particle size (plastomer pellets)

Particle size distribution and shape evaluation is performed based on image analysis methods. Pellets are transported on a vibration table. A high speed line camera takes a two-dimensional image of each particle in free falling mode. Such a system measures the size of the particles as the diameter of an equivalent circle. Pellets are divided into e.g. the following classes: 1000 µm, 2000 µm, 2500 µm, 3000 µm, 3500 µm, 4000 µm, 5000 µm, 6000 µm, >6000 µm.

For each particle following parameters are determined: shape factor, elongation, roundness, sieve diameter, convexity and roughness. Depending on the value of these 6 parameters, the particles are divided into: pellets, clusters, tailed, multiples, long, dust, angelhair or miscuts.

The measurement of contaminants on pellets, together with pellet shape and size can be done using a PA66 consisting of a PS25C and a PSSD and or an equivalent instrument set up from OCS GmbH. The PS25C and PSSD can be used independently and be considered as separate systems.

e) Flexural modulus

The flexural modulus is determined in 3-point-bending according to ISO 178 on 80×10×4 mm³ test bars injection moulded at 23° C. in line with EN ISO 1873-2.

f) Vicat temperature

The Vicat temperature is measured according to ISO 306, method A50. A flat-ended needle loaded with a mass of 10 N is placed in direct contact with an injection moulded test specimen with the dimensions of 80×10×4 mm³ as described in EN ISO 1873-2. The specimen and the needle are heated at 50° C./h. The temperature at which the needle has penetrated to a depth of 1 mm is recorded as the Vicat softening temperature.

g) Temperature of the gas (gasstream)

The temperature of the gas (gasstream) is measured with thermocouples at two sides of the gas inlet on the gas distribution ring. Also the temperatures of the gas outlet and the top of the plastomer bed are measured.

h) Pressure of the gasstream

The pressure of the gasstream is measured at the free headspace.

Comparative Example 1 (CE1)

The concentration profile along an aeration time of three days was simulated for an aeration process without recirculation. The reduction of VOC (ppm) over time (h) was simulated for plastomer pellets having a density of 868 kg/m³ and a $MFR_2$ of 0.5 g/10 min. The plastomer was subjected to the simulation of the aeration process according to the invention. The initial VOC content (VOC, VDA277) of the plastomer pellets was 194 ppm. The targeted VOC content was 65 ppm. The aeration vessel was a silo with an inner diameter of 3.5 m and total volume of 165 m³ holding 70 tons of the plastomer pellets. The gas used for aeration simulation was air. The air temperature was 30° C. The air flowrate was set to 1000 m³/h and the gasflow was 14.3 m³/(h·t).

After 20 h the VOC content was 120 ppm and after 40 h the VOC content was still 75 ppm. After about 44 h the targeted VOC content of 65 ppm was reached.

The equations were solved numerically and simulated in Aspen Custom Modeller, which offers both a model development environment and flowsheet modelling.

Example 1 (Ex1)

The concentration profile along an aeration time of two days was simulated for an aeration process with recirculation. The reduction of VOC (ppm) over time (h) was simulated for plastomer pellets having a density of 868 kg/m³ and a $MFR_2$ of 0.5 g/10 min. The plastomer was subjected to the simulation of the aeration process according to the invention. The initial VOC content (VOC, VDA277) of the plastomer pellets was 194 ppm. The targeted VOC content was 65 ppm. The aeration vessel was a silo with an inner diameter of 3.5 m and total volume of 165 m³ holding 70 tons of the plastomer pellets. The gas used for the simulation of the aeration was air. The air temperature was 30° C. The air flowrate was set to 1000 m³/h and the gasflow was 14.3 m³/(h·t). The recirculation was 1425 kg/h of plastomer pellets.

After 20 h the VOC content was 80 ppm and after 40 h the VOC content was 35 ppm. After about 24 h the targeted VOC content was reached.

The equations were solved numerically and simulated in Aspen Custom Modeller, which offers both a model development environment and flowsheet modelling.

Example 2 (Ex2)

The concentration profile along an aeration time of two days was simulated for an aeration process with recirculation. The reduction of VOC (ppm) over time (h) was simulated for plastomer pellets having a density of 868 kg/m³ and a $MFR_2$ of 0.5 g/10 min. The plastomer was subjected to the simulation of the aeration process according to the invention. The initial VOC content (VOC, VDA277) of the plastomer pellets was 194 ppm. The targeted VOC content was 65 ppm. The aeration vessel was a silo with an inner diameter of 3.5 m and total volume of 165 m³ holding 70 tons of the plastomer pellets. The gas used for the simulation of the aeration was air. The air temperature was 30° C. The air flowrate was set to 1000 m³/h and the gasflow was 14.3 m³/(h·t). The recirculation was 2850 kg/h of plastomer pellets.

After 20 h the VOC content was 75 ppm and after 40 h the VOC content was 30 ppm. After about 23 h the targeted VOC content was reached.

The equations were solved numerically and simulated in Aspen Custom Modeller, which offers both a model development environment and flowsheet modelling.

In Table 1 the simulation conditions and the results of the simulation for CE1 and Ex1 and Ex2 are shown.

TABLE 1

| Value | Units | CE1 | Ex1 | Ex2 |
|---|---|---|---|---|
| Initial VOC | ppm | 194 | 194 | 194 |
| $MFR_2$ | g/10 min | 0.5 | 0.5 | 0.5 |
| density | kg/m³ | 868 | 868 | 868 |

TABLE 1-continued

| Value | Units | CE1 | Ex1 | Ex2 |
|---|---|---|---|---|
| Aeration conditions | | | | |
| gasflow | m³/(h · t) | 14.3 | 14.3 | 14.3 |
| gas temperature | ° C. | 30 | 30 | 30 |
| recirculation | kg/h | — | 1425 | 2850 |
| recirculation rate | %/h | — | 2.0 | 4.1 |
| Achieving VOC content of 65 ppm | h | 44 | 24 | 23 |
| After aeration for 20 h | | | | |
| VOC | ppm | 120 | 80 | 75 |
| After aeration for 40 h | | | | |
| VOC | ppm | 75 | 35 | 30 |

From Table 1 can be derived, that recirculation decreases the aeration time significantly. After about 24 h or 23 h, respectively, the targeted VOC content of 65 ppm is reached in Examples 1 and 2 whereas it takes about 44 h in Comparative Example 1. It is advantageous that recirculation is performed in order to reduce the content of VOCs. This is in particular of interest as those conditions allow accelerated aeration of particularly soft polymers which is usually time consuming and challenging.

Preparation of Plastomers According to the Present Invention

The preparation of the plastomers for the present invention is described in EP 3 023 450 incorporated by reference herewith.

The invention claimed is:

1. A process for reducing the volatile organic compound (VOC) content of plastomers the process comprising the steps of
    a) subjecting the plastomer in granular form containing VOCs which is contained in an aeration vessel to a gas flow,
    and
    b) withdrawing granular plastomer from the aeration vessel which has a lower content of VOCs,
    wherein the average particle size of the granular plastomer is greater than 2.5 mm,
    wherein the gas has a minimum temperature of at least 26° C. measured at a gas inlet of the aeration vessel, and a maximum temperature of 4° C. below the Vicat temperature (10N, ISO 306) of the granular plastomer or 35° C. measured at the gas inlet of the aeration vessel, whichever value is lower, and
    wherein at least a part of the withdrawn granular plastomer is recirculated to the aeration vessel.

2. The process according to claim 1,
    wherein the recirculation rate of the granular plastomer recirculated to the aeration vessel is between 0.25 and 10 percent per hour.

3. The process according to claim 1,
    wherein the gas flow in step a) is within the range of 5 m³/(h·t) to 150 m³/(h·t).

4. The process according to claim 1,
    wherein the gas stream in step a) is within the range of 5.0 l/(h·cm²) to 50.0 l/(h·cm²).

5. The process according to claim 1,
    wherein the aeration time in step a) is less than 40 hours.

6. The process according to claim 1,
    wherein step a) is run for at least 2 hours.

7. The process according to claim 1,
    wherein the plastomers are homo- or copolymers of ethylene.

8. The process according to claim 1,
    wherein the granular plastomer in step a) has a density of equal or lower than 900 kg/m³.

9. The process according to claim 1,
    wherein the granular plastomer in step a) has a MFR2 of 25.0 g/10 min or lower (ISO 1133 at 2.16 kg load and 190° C.).

10. The process according to claim 1,
    wherein the granular plastomer withdrawn in step b) has a VOC content (VOC, VDA277) of below 65 ppm.

11. The process according to claim 1,
    wherein the process is used in a continuous polymerization process.

12. The process according to claim 1,
    wherein the recirculation of the at least a part of the withdrawn granular plastomer to the aeration vessel is conducted at a velocity of less than 15 m/s.

13. The process according to claim 1,
    wherein the aeration vessel comprises a silo comprising a main vertical cylinder and a conical section at the bottom of the cylinder, and
    wherein the cone angle of the conical section is less or equal 40°.

14. The process according to claim 1,
    wherein the gas used in step a) is $N_2$ containing gas.

15. The process according to claim 1,
    wherein the gas in step a) is injected from the bottom of the aeration vessel.

16. The process of claim 1, wherein the average particle size of the granular plastomer is greater than 2.7 mm.

17. The process of claim 1, wherein the average particle size of the granular plastomer is greater than 3.0 mm.

18. The process of claim 1, wherein the plastomers are copolymers of ethylene and octene.

19. The process of claim 1, wherein the granular plastomer in step a) has a density of equal or lower than 883 kg/m³.

20. The process of claim 1, wherein the gas used in step a) is air.

* * * * *